(12) United States Patent
Thoma et al.

(10) Patent No.: US 8,445,850 B2
(45) Date of Patent: May 21, 2013

(54) OPTICAL REMOTE SENSING OF FUGITIVE RELEASES

(75) Inventors: Eben Daniel Thoma, Cary, NC (US); Cary Doman Secrest, Bethesda, MD (US); William A. Mitchell, New Hill, NC (US); William C. Squier, Angier, NC (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 0 days.

(21) Appl. No.: 13/164,046

(22) Filed: Jun. 20, 2011

(65) Prior Publication Data

US 2011/0309248 A1    Dec. 22, 2011

Related U.S. Application Data

(60) Provisional application No. 61/344,271, filed on Jun. 21, 2010.

(51) Int. Cl.
*G01J 5/02*    (2006.01)

(52) U.S. Cl.
USPC .................................. 250/339.06

(58) Field of Classification Search
USPC ............... 250/339.01–339.15, 461.1
See application file for complete search history.

(56) References Cited

U.S. PATENT DOCUMENTS

| | | | |
|---|---|---|---|
| 4,426,640 A * | 1/1984 | Becconsall et al. | 340/632 |
| 5,255,073 A | 10/1993 | Wallin et al. | |
| 6,061,141 A * | 5/2000 | Goldenberg et al. | 356/437 |
| 7,288,770 B2 * | 10/2007 | Gamiles et al. | 250/372 |
| 2004/0018630 A1 * | 1/2004 | Birks et al. | 436/116 |
| 2004/0039298 A1 * | 2/2004 | Abreu | 600/558 |
| 2005/0157303 A1 * | 7/2005 | Langford et al. | 356/437 |
| 2007/0045542 A1 | 3/2007 | Hashmonay | |
| 2007/0110632 A1 * | 5/2007 | Garver et al. | 422/101 |

OTHER PUBLICATIONS

Nagali et al., "Design of a diode-laser sensor to monitor water vapor in high-pressure combustion gases," 1997, Applied Optics, vol. 36, No. 36 pp. 9518-9527.*
Thoma, et al., "Measurement of Low Level Air Toxics with Modified UV DOAS," Proceedings of the 99th Annual Conference, Air & Waste Management Association, New Orleans LA, Jun. 20, 2006, pp. 1-33.
Modrak et al., "Development of a Novel Optical Remote Sensing Monitor for Fenceline Monitoring and Enhancement of Existing Leak Detection and Repair Programs," Research Triangle Park, NC, (no date) pp. 1.
Mitchell et al., "Simplified and Low Cost Optical Remote Sensing Technology for Fenceline Monitoring of Fugitive Releases," Abstract # 190, 103rd Annual Conference of the A&WMA, Calgary, Alberta Canada, Jun. 2010, pp. 1-8.

* cited by examiner

*Primary Examiner* — Kiho Kim
(74) *Attorney, Agent, or Firm* — Summa, Addition & Ashe, P.A.

(57) ABSTRACT

Disclosed is an open-path optical sensor. Typically, the optical sensor directs UV radiation from a source assembly to a detector assembly along a monitoring path. The source assembly emits UV radiation corresponding to a signal channel and to a reference channel. The detector assembly detects UV radiation corresponding to the signal channel and to the reference channel. The detector assembly is in communication with a data acquisition system, which compares the intensity of the detected UV radiation corresponding to the signal channel to the intensity of the UV radiation corresponding to the reference channel.

20 Claims, 5 Drawing Sheets

OPTICAL REMOTE SENSING OF FUGITIVE RELEASES

CROSS-REFERENCE TO PRIORITY APPLICATION

This application claims the benefit of U.S. Patent Application Ser. No. 61/344,271 for Optical Remote Sensing of Fugitive Releases (filed Jun. 21, 2010), which is hereby incorporated by reference in its entirety.

FIELD OF THE INVENTION

The present invention embraces an open-path optical sensor and a related system and method.

BACKGROUND

Generally speaking, there are two broad categories of ground-based air-pollution monitors: (i) point monitors and (ii) open-path monitors.

Most air-pollution measurement systems employ point monitors. Point monitors typically sample air from one point in space (e.g., via sampling tubes and pumps or via direct sampling). Alternatively, point monitors can sample multiple locations by employing a network of tubing. Point monitors can be positioned at a fixed location or can be mobile (e.g., positioned on a mobile sampling vehicle). Point monitors can be used to make physical, chemical, or spectroscopic measurements of the air being sampled.

Open-path monitors project an optical beam through space (e.g., along a monitoring path) so as to observe a continuum of points simultaneously. An open-path monitor can be bistatic or monostatic. A bistatic open-path monitor employs an optical source and a separate, down-range receiver. A monostatic open-path monitor employs a combined source/receiver and therefore also employs a down-range reflector (e.g., an array of mirrors). Because open-path monitors project a beam of electromagnetic radiation across space, open path monitors are typically limited to measurements made with optical spectroscopy.

When measuring relatively homogenous air masses (i.e., where the air mass along the optical beam is homogeneous), open-path monitors offer little advantage over point monitors. Indeed, open-path monitors are typically more complex and expensive than point monitors. That said, open-path monitors are superior when an air mass contains distinct plumes of pollutants (e.g., from a leak). An open-path monitor can detect a fugitive plume at any point along the optical beam. Open-path monitors can also provide near real-time monitoring. Therefore, open-path monitors are particularly suitable for fence-line monitoring (e.g., around the perimeter of an industrial facility).

An exemplary technique for operating an open-path monitor is ultraviolet differential optical absorption spectroscopy (UV DOAS). UV DOAS systems are described in U. Platt, *Differential Optical Absorption Spectroscopy (DOAS)*, in 127 CHEMICAL ANALYSIS, AIR MONITORING BY SPECTROSCOPIC TECHNIQUES 27 (Markus W. Sigrist ed., 1994), which is hereby incorporated by reference in its entirety. UV DOAS systems are also described in E. D. Thoma & E. L. Thompson, *Measurement of Low Level Air Toxics with Modified UV DOAS*, Proceedings of the 99th Annual Conference of the Air & Waste Management Association (Jun. 20-23, 2006), which is hereby incorporated by reference in its entirety.

Other exemplary techniques include open-path Fourier transform infrared (OP-FTIR) spectroscopy, tunable diode laser absorption spectroscopy (TDLAS), and differential absorption laser (DIAL) spectroscopy. U.S. Patent Application Publication No. 2007/0045542, which is hereby incorporated by reference in its entirety, discloses an optical remote sensing monitor employing tunable diode laser absorption spectroscopy or open-path Fourier transform infrared spectroscopy.

These techniques detect pollution through speciation. In other words, these techniques detect specific compounds with spectroscopy. Speciation requires a high spectral resolution. Accordingly, these techniques require sophisticated hardware and software. High-performance equipment is generally expensive. Moreover, this high-performance and precise equipment lacks the robustness needed for long-term outdoor applications.

Accordingly, a need exists for a more robust open-path pollution monitor.

SUMMARY

Accordingly, in one aspect the present invention embraces an open-path optical sensor. The optical sensor includes a source assembly that typically emits UV radiation corresponding to a signal channel and to a reference channel. The signal channel is typically a wavelength or range of wavelengths between about 170 nanometers and 230 nanometers. The reference channel is typically a wavelength or range of wavelengths between about 260 nanometers and 300 nanometers.

A detector assembly receives UV radiation emitted by the source assembly (e.g., emitted across a monitoring path). The detector assembly typically includes (i) a first detector for detecting UV radiation corresponding to the signal channel, (ii) a second detector for detecting UV radiation corresponding to the reference channel, and (iii) a data acquisition system in communication with said first detector and said second detector.

The first detector typically includes a band-pass filter for rejecting UV radiation outside of the signal channel. The second detector typically includes a band-pass filter for rejecting UV radiation outside of the reference channel. The data acquisition system typically calculates the ratio of the intensity of the UV radiation corresponding to the signal channel to the intensity of the UV radiation corresponding to the reference channel.

In another aspect, the present invention embraces a method of monitoring pollutant concentrations. UV radiation corresponding to a signal channel is emitted along a monitoring path. The signal channel is a wavelength or range of wavelengths between about 170 nanometers and 230 nanometers (e.g., between about 200 nanometers and 210 nanometers). UV radiation corresponding to a reference channel is also emitted along the monitoring path. The reference channel is a wavelength or range of wavelengths between about 260 nanometers and 300 nanometers (e.g., between about 270 nanometers and 290 nanometers).

The intensity of the UV radiation corresponding to the signal channel is detected after the UV radiation has traversed the monitoring path. Moreover, the intensity of the UV radiation corresponding to the reference channel is detected after the UV radiation has traversed the monitoring path. The UV radiation may be filtered to eliminate UV radiation not corresponding to either the signal channel or the reference channel. Finally, the method typically includes calculating the ratio of the intensity of the UV radiation corresponding to the signal channel to the intensity of the UV radiation corresponding to the reference channel.

In one embodiment, the UV radiation is emitted at a regular pulse frequency. Accordingly, the method may include filtering the UV radiation to eliminate UV radiation not having the same regular pulse frequency as the emitted UV radiation.

The foregoing illustrative summary, as well as other exemplary objectives and/or advantages of the invention, and the manner in which the same are accomplished, are further explained within the following detailed description and its accompanying drawings.

DETAILED DESCRIPTION

Numerous hazardous organic and inorganic air pollutants possess broadband absorption in the deep-ultraviolet (DUV) spectral range, typically between about 170 nanometers and 230 nanometers (e.g., between about 185 nanometers and 225 nanometers), more typically between about 190 nanometers and 210 nanometers. Exemplary compounds that exhibit such DUV absorption include unsaturated hydrocarbons, 1,3-butadiene, benzene, formaldehyde, xylene, toluene, naphthalene, styrene, hydrogen sulfide, and ammonia.

Figure 1:
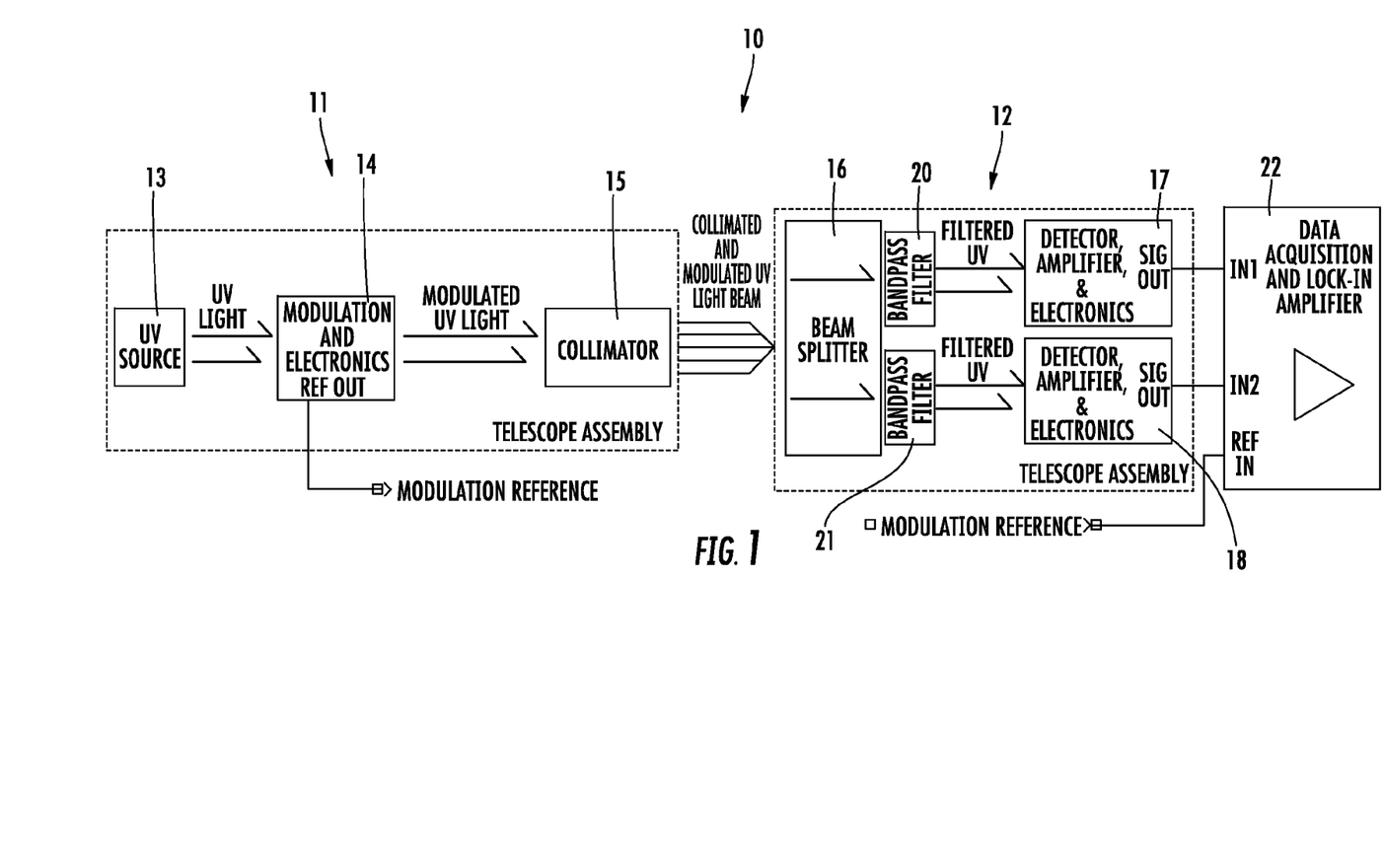
FIG. 1 schematically depicts a deep-ultraviolet optical sensor in accordance with the present invention.

Accordingly, in one aspect, the present invention embraces a deep-ultraviolet optical sensor (DUVOS). FIG. 1 schematically depicts a deep-ultraviolet optical sensor (DUVOS) 10 in accordance with the present invention. The deep-ultraviolet optical sensor 10 typically includes a source assembly 11 and a detector assembly 12.

The source assembly 11 includes one or more UV sources 13 for emitting a beam of UV radiation, typically along a monitoring path (e.g., a beam path). Various types of UV sources may be employed. For example, the UV source 13 may be a xenon lamp (e.g., a pulsed xenon lamp), a deuterium lamp, an ultraviolet light emitting diode (UVLED), a UV laser, or a laser-enhanced light source (e.g., a LDLS™ Laser-Drive Light Source commercially available from Energetiq Technology, Inc., Woburn, Mass.). In another embodiment, the UV source 13 can be an optical fiber that transmits UV radiation from a separate source of UV radiation. The foregoing notwithstanding, other suitable sources of UV radiation are within the scope of the present invention.

UV source 13 typically emits UV radiation corresponding both to a signal channel and to a reference channel. In an alternative embodiment, the source assembly 11 may include a plurality of UV sources, where a first UV source emits UV radiation corresponding to a signal channel and a second UV source emits UV radiation corresponding to a reference channel.

The UV source 13 may be a continuous source or a pulsed source (e.g., emitting UV radiation at a regular pulse frequency). In other words, the UV source 13 may emit a continuous or pulsed beam of UV radiation. If a continuous UV source is employed, the source assembly 11 typically includes a modulator 14 (i.e., for modulating the UV radiation after the UV radiation is emitted by the UV source). Typically, the modulator 14 employs pulse modulation (e.g., pulse frequency modulation). In one embodiment, the modulator is an optical chopper wheel. Therefore, regardless of whether the UV source is a continuous source or a pulsed source, the source assembly typically emits UV radiation at a regular pulse frequency (e.g., along a monitoring path). The modulator 14 typically includes electronics for creating a modulation reference signal, which includes information regarding the modulated UV radiation, such as pulse width and pulse frequency. The foregoing notwithstanding, it is within the scope of the present invention for the source assembly to emit unmodulated UV radiation.

Some sources of UV radiation, such as a UV laser, are highly collimated (i.e., emitting substantially parallel rays of UV radiation). Other sources of UV radiation, however, are not highly collimated. Therefore, the source assembly 13 may include an optical collimator 15 (e.g., collimating optics). For example, the optical collimator 15 can be a curved lens positioned so that the UV source is located at its focus. Accordingly, the emitted rays of UV radiation will be substantially parallel after passing through the collimator.

The detector assembly 12 receives UV radiation emitted by the source assembly 11. The detector assembly 12 typically includes a beam splitter 16. The beam splitter 16 transmits about half of the received UV radiation to a first detector 17 and the other half of the received UV radiation to a second detector 18. Typically, each detector is a high-gain detector, such as a photomultiplier tube (e.g., a solar-blind photomultiplier tube) or a solid-state diamond detector.

Each detector 17 and 18 typically includes a band-pass filter 20 and 21. The band-pass filter 20 of the first detector 17 corresponds to a selected signal channel (i.e., signal wavelength or range of wavelengths). The signal channel is chosen for a wavelength (or range of wavelengths) that is absorbed by the compound(s) of interest, typically a wavelength between about 170 nanometers and 230 nanometers (e.g., between about 190 nanometers and 210 nanometers), more typically a wavelength between about 200 nanometers and 210 nanometers (e.g., about 205 nanometers). Therefore, the first detector 17 detects the intensity of received UV radiation corresponding to the signal channel.

The band-pass filter 21 of the second detector 18 corresponds to a selected reference channel. The reference channel is chosen for a wavelength (or range of wavelengths) that is not significantly absorbed by the compound(s) of interest and where minimal interference exists. Typically, the reference channel is a wavelength between about 260 nanometers and 300 nanometers, such as between about 270 nanometers and 290 nanometers (e.g., about 280 nanometers). Therefore, the second detector 18 detects the intensity of received UV radiation corresponding to the reference channel.

As depicted in FIG. 1, the detectors 17 and 18 are in communication with a data acquisition system 22, which typically includes a processor and associated memory. The data acquisition system 22 also typically includes a lock-in amplifier. The lock-in amplifier is used to eliminate non-modulated background electromagnetic radiation. In other words, the lock-in amplifier typically eliminates background radiation that does not have the same modulation characteristics (e.g., pulse frequency) as the UV radiation emitted by the source assembly. Therefore, the lock-in amplifier is typically in communication with the source assembly 11 (e.g., for receiving the modulation reference from the source assembly).

In an exemplary embodiment, the data acquisition system 22 also includes automatic gain control circuitry, which can compensate for zero drift. By way of example, the data acquisition system 22 may analyze the input signals from the first and second detectors during time periods not impacted by the presence of any compounds of interest to establish base-line signal values. The data acquisition system 22 may adjust detector gain or UV-source power in response to changes in the base-line signal values.

After any non-modulated background radiation is eliminated, the data acquisition system 22 calculates the ratio of the outputs from the first detector 17 and the second detector 18 (e.g., a ratio of the voltage outputs from the first and second detectors 17 and 18). In other words, the data acquisition system 22 compares the intensity of detected UV radiation corresponding to the signal channel to the intensity of the UV radiation corresponding to the reference channel. This calculated ratio reflects the path-integrated absorbance of the signal-channel and reference-channel wavelengths by the compounds of interest (e.g., pollutants) along the monitoring path. The concentration of the compounds can be calculated (e.g., by using the Beer-Lambert law) once the absorbance (e.g., the absorbance of the signal-channel and/or reference-channel wavelengths) has been determined.

In this regard, the reference channel facilitates the elimination of false positive readings. For example, although a cloud of dust would absorb UV radiation corresponding to the signal channel, the cloud of dust would also absorb UV radiation corresponding to the reference channel. Therefore, the deep-ultraviolet optical sensor can use the absorption of both signal and reference wavelengths (e.g., as represented by the signal channel to reference channel ratio) to recognize a false signal (i.e., that something other than a pollutant is absorbing UV radiation corresponding to the signal channel).

In some applications, such as where the monitoring path is short or the risk of false positive readings is low, the benefits of utilizing a reference channel are minimal. Therefore, in an alternative embodiment, the optical sensor does not employ a reference channel. Such an optical sensor typically includes (i) a source assembly emitting UV radiation corresponding to a signal channel and (ii) a detector assembly, which itself includes a first detector for detecting UV radiation corresponding to the signal channel and a band-pass filter for rejecting UV radiation outside of the signal channel. A data acquisition system may be used to calculate the concentration of any detected pollutants.

Additional filtering (e.g., noise filtering) may be performed by the data acquisition system 22. For example, the data acquisition system 22 may use (i) smoothing algorithms (e.g., exponential smoothing), (ii) a correlation filter, (iii) synchronized time, (iv) scanning-source detection schemes, (v) signal averaging, and/or (vi) temporal filters.

Deep-ultraviolet optical sensors in accordance with the present invention typically do rely upon spectroscopy to determine the presence of pollutants. Accordingly, the present deep-ultraviolet optical sensors are more robust and less expensive than current commercially available open-path monitors. Moreover, the present invention facilitates faster measurements than is typically possible using commercially available open-path monitors. For example, the present optical sensors can typically make measurements at a rate of about 1 Hz. In contrast, commercially available open-path monitors (e.g., OP-FTIR systems) often require at least one minute to make a robust measurement. By making faster measurements, the present optical sensors can more accurately determine the peak concentration (e.g., path-averaged concentration) of pollutants in a plume.

Figure 2:
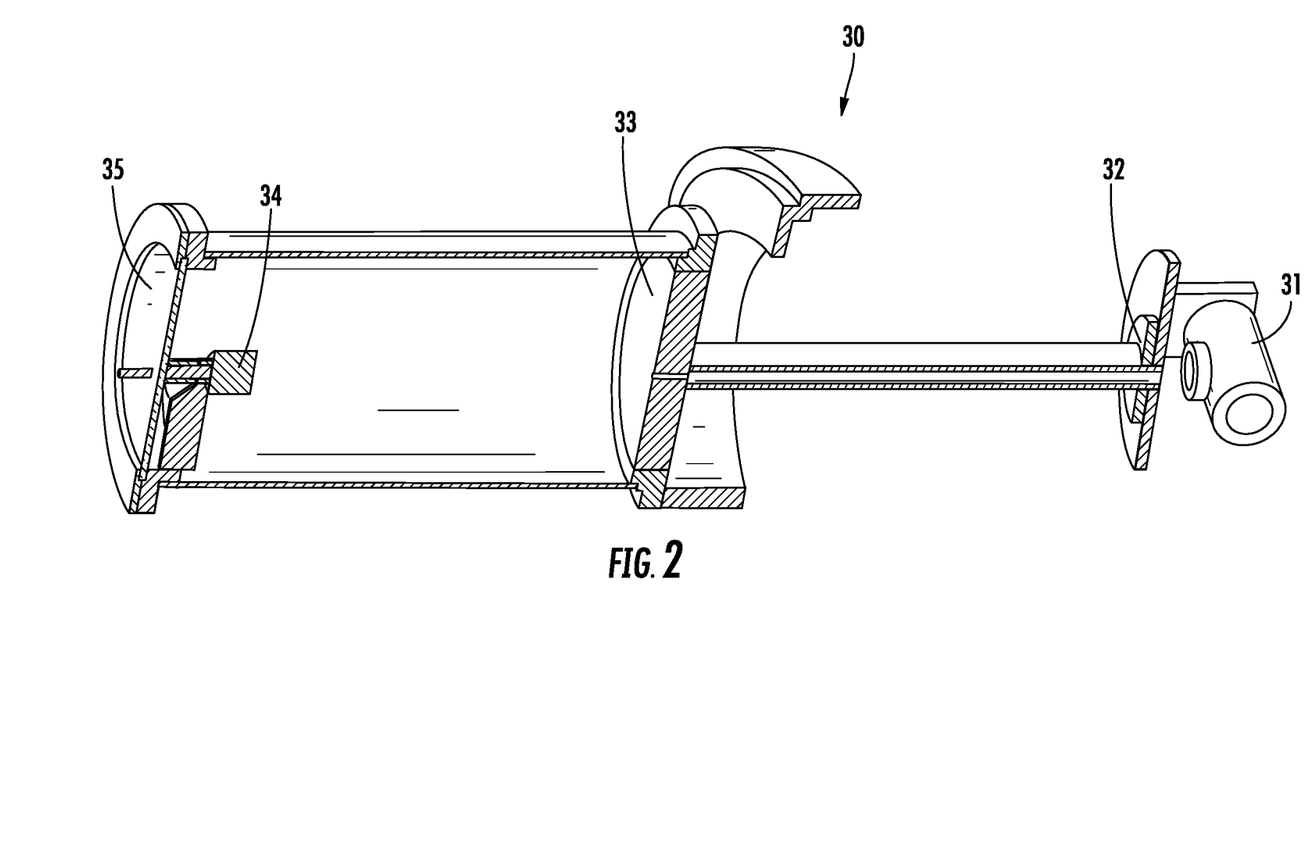
FIG. 2 schematically depicts a source telescope in accordance with the present invention.
Figure 3:
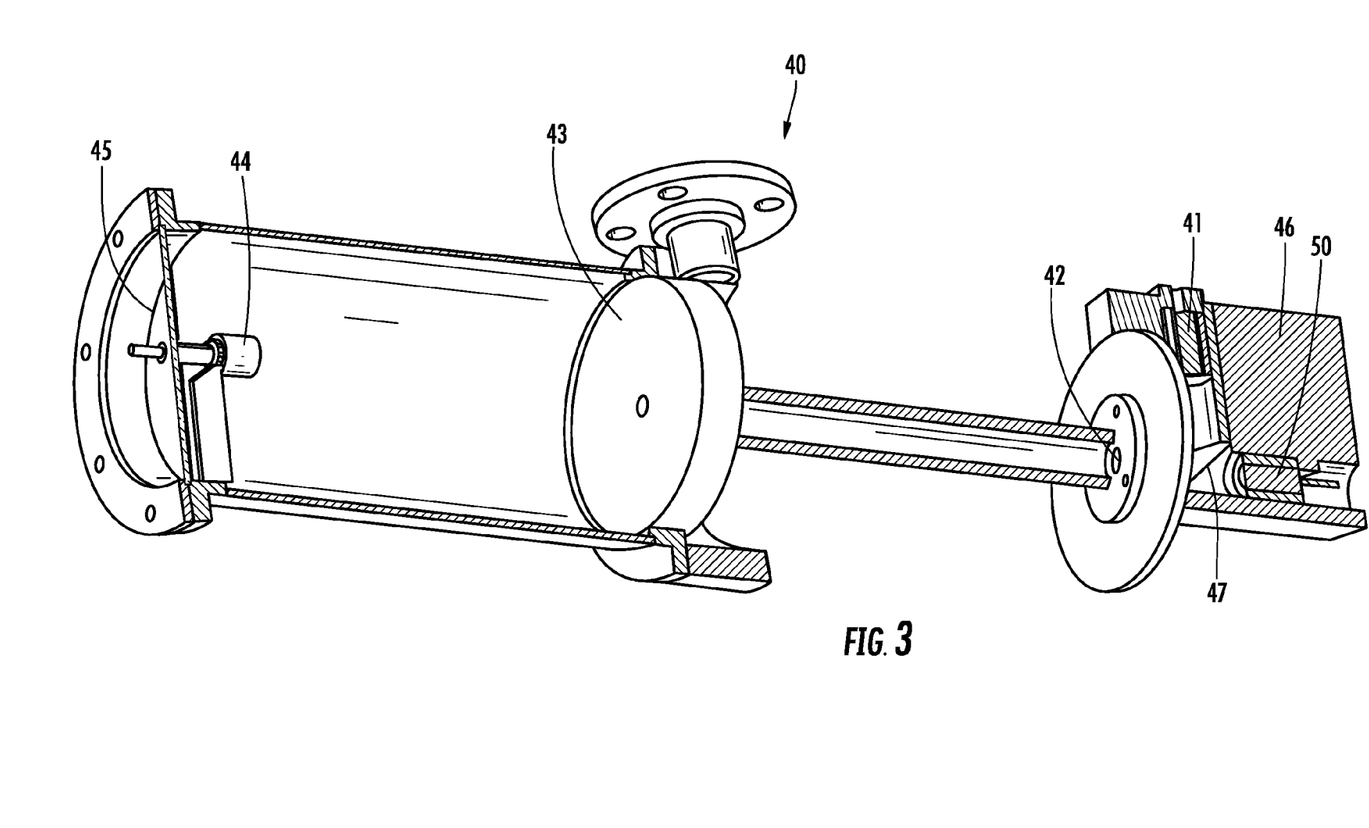
FIG. 3 schematically depicts a detector telescope in accordance with the present invention.
Figure 4:
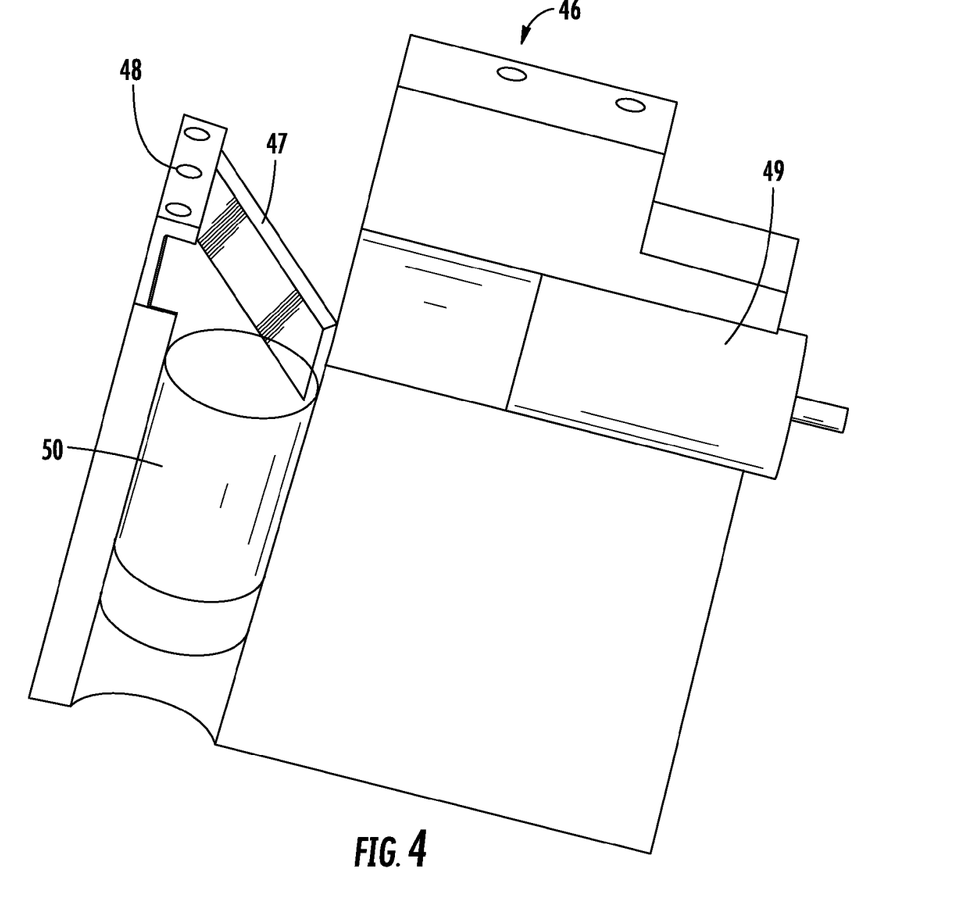
FIG. 4 schematically depicts a detector block in accordance with the present invention.

FIGS. 2-4 depict an exemplary deep-ultraviolet optical sensor in accordance with the present invention. The deep-ultraviolet optical sensor depicted in FIGS. 2-4 includes a source assembly 30 (e.g., a source telescope) depicted in FIG. 2 and a detector assembly 40 (e.g., a detector telescope) depicted in FIG. 3.

The source telescope 30 typically includes a UV source 31, a focusing lens 32, a primary mirror 33, a secondary mirror 34, and a sealed UV window 35. The UV source 31 is typically easily removable from the source telescope 30 so that removal of the UV source 31 (e.g., for maintenance) does not disturb the alignment of the source telescope 30.

The focusing lens 32, primary mirror 33, and secondary mirror 34 direct UV radiation from the UV source 31 to the detector telescope 40. In some embodiments, the lens 32, primary mirror 33, and secondary mirror 34 also collimate the UV radiation emitted by the UV source 31. In some embodiments, the primary mirror 33 and the secondary mirror 34 can include a dual-band dielectric coating. The dual-band dielectric coating enhances reflectivity of the mirrors for desirable bands of UV radiation (e.g., corresponding to the signal and reference channels) but reduces the transmission of unwanted electromagnetic radiation. Such dielectric coatings are generally well understood and will not be otherwise described herein in detail.

The sealed UV window 35 is typically transparent to UV radiation (e.g., wavelengths of UV radiation corresponding to the signal channel and reference channel) but blocks other wavelengths of electromagnetic radiation. The sealed UV window 35 reduces the potential of damage to the source telescope from dust and humidity by limiting airflow within the source telescope 30 and containing excess heat generated by the UV source 31.

The detector telescope 40 typically includes a focusing lens 42, a primary mirror 43, a secondary mirror 44, a sealed UV window 45, and a detector block 46. The focusing lens 42, primary mirror 43, and secondary mirror 44 serve to, among other things, direct received UV radiation to the detector block 46. In some embodiments, the primary mirror 43 and the secondary mirror 44 can include a dual-band dielectric coating. The UV window 45 is typically transparent to UV radiation but blocks other wavelengths of electromagnetic radiation.

The detector block 46 is depicted in more detail in FIG. 4. The detector block includes a beam splitter 47 that directs received UV radiation to a first detector 49 and a second detector 50 (e.g., photomultiplier tubes or solid-state diamond detector). The beam splitter 47 is held in place by a support 48. The detector block 46 is typically easily removable from the detector telescope 40 so that removal of the detector block 46 (e.g., for maintenance) does not disturb the alignment of the detector telescope 40.

The source assembly 30 and the detector assembly 40 typically include a cooling system. For example, the source assembly 30 and the detector assembly 40 may include a passive radiator. Moreover, the source assembly 30 and the detector assembly 40 may include a thermoelectric cooler.

Many compounds detectable by the present deep-ultraviolet optical sensor (e.g., unsaturated hydrocarbons, 1,3-butadiene, benzene, formaldehyde, xylene, toluene, naphthalene, styrene, hydrogen sulfite, and ammonia) exhibit stronger DUV absorption than absorption of other UV ranges, such as those ranges employed by previous speciating open-path monitors. Accordingly, the present deep-ultraviolet optical sensors have a superior detection limit as compared to commercially available open-path monitors.

In this regard, an exemplary deep-ultraviolet optical sensor in accordance with the present invention was tested in a laboratory setting. During the testing, a 0.2606-meter optical cell was positioned in the beam path between a source assembly and a receiver assembly. The source assembly and the receiver assembly were positioned about two meters apart.

The optical cell included a stainless steel cylinder. Each end of the stainless steel cylinder was fitted with a 20-centimeter-diameter/0.32-centimeter-thick, S1-grade-quartz window. The windows were secured with steel rings and polytetrafluoroethylene (PTFE) gaskets. The optical cell also included gas line fittings to allow gases to flow through the optical cell.

After the optical cell was positioned in the beam path, a hydrocarbon mixture was passed through the optical cell. The hydrocarbon mixture included a 108 parts per million (ppm) gas mixture of approximately equal amounts of benzene, ethyl benzene, o-xylene, and toluene, with the balance of the mixture being nitrogen. This mixture was further diluted with nitrogen using a calibrated Environics Series 2000 multi-component gas mixer in flow-through mode. The amount of further nitrogen dilution varied during the testing.

In order to detect the concentration of the gases (i.e., benzene, ethyl benzene, o-xylene, and toluene) within the hydrocarbon mixture, the deep-ultraviolet optical sensor employed a signal-channel wavelength of 204 nanometers and a reference-channel wavelength of 280 nanometers.

Figure 5:
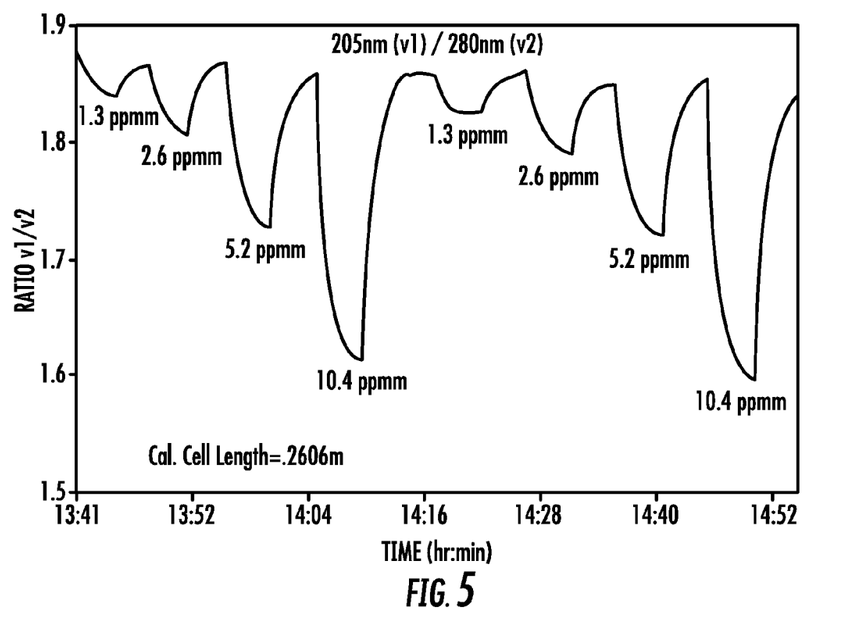
FIG. 5 depicts testing results showing the concentration of pollutants detected with an exemplary deep-ultraviolet optical sensor in accordance with the present invention.

FIG. 5 depicts the results of this testing. In particular, FIG. 5 shows that detection limits below about 2.0 parts per million-meter (ppmm) (e.g., below about 1.0 parts per million-meter) are possible. Those having ordinary skill in the art will appreciate that parts per million-meter refers to the units associated with a path-integrated concentration, which is independent of the length of the beam of UV radiation.

Similar testing was also performed outdoors. During the outdoor testing, a one-meter optical cell was positioned in the beam path between a source assembly and a receiver assembly. The source assembly and the receiver assembly were positioned about 200 meters apart. The outdoor testing also achieved detection limits below about 2.0 parts per million-meter (ppmm) (e.g., below about 1.0 parts per million-meter).

Figure 6:
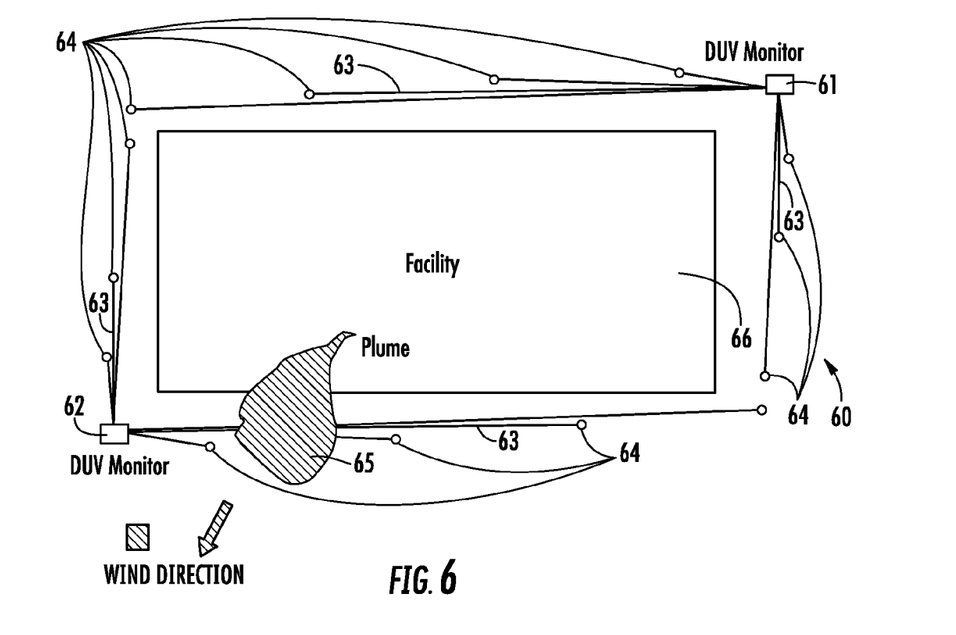
FIG. 6 schematically depicts a monitoring system in accordance with the present invention.

In another aspect, the present invention embraces a deep-ultraviolet monitoring system (e.g., a fence-line monitoring system). FIG. 6 depicts an exemplary deep-ultraviolet monitoring system 60 for detecting a fugitive release (e.g., a plume 65) from a facility 66 (e.g., an industrial facility).

The deep-ultraviolet monitoring system 60 typically includes a plurality of optical sensors (e.g., 2 or more). In this regard, the deep-ultraviolet monitoring system 60 depicted in FIG. 6 includes two deep-ultraviolet optical sensors 61 and 62 (e.g., deep-ultraviolet monitors). The optical sensors 61 and 62 can be portable or fixed in location.

Each optical sensor 61 and 62 in accordance with the present invention is typically capable of scanning along beam paths (e.g., monitoring paths) having a length of one kilometer or more (e.g., three kilometers). Moreover, each optical sensor 61 and 62 is typically capable of scanning along multiple beam paths (e.g., the beam paths 63 depicted in FIG. 6). Alternatively, each optical sensor in the monitoring system may scan along a single beam path.

Each deep-ultraviolet optical sensor 61 and 62 can have a bistatic configuration or a monostatic configuration. In a bistatic configuration, a source assembly is positioned at the far end 64 of each beam path 63. Each source assembly directs UV radiation to a detector assembly located where the beam paths converge. The detector assembly may be mounted on a positioning device (e.g., a turntable or a gimbal mechanism), thereby allowing the detector assembly to be repositioned to monitor multiple beam paths. Alternatively, a gimbal mirror may be used to direct UV radiation from one of the multiple beam paths to the detector assembly.

In an alternative bistatic configuration, a detector assembly is positioned at the far end 64 of each beam path 63. A source assembly at the opposite end of the beam paths directs UV radiation to the detector assemblies. The source assembly may be mounted on a positioning device (e.g., a turntable or a gimbal mechanism), thereby allowing the source assembly to be repositioned to direct UV radiation along the multiple beam paths. Alternatively, a gimbal mirror may be used to direct UV radiation along the multiple beam paths.

In a monostatic configuration, a source assembly and a detector assembly are positioned adjacent to one another. A reflector (e.g., a retro reflecting mirror) is positioned at the far end 64 of each beam path 63 (e.g., monitoring path). The source assembly directs UV radiation to a reflector, which reflects the UV radiation to the detector assembly. The source assembly and detector assembly may be mounted together on a positioning device (e.g., a turntable or a gimbal mechanism), thereby allowing the deep-ultraviolet optical sensor to be reoriented to monitor multiple beam paths. Alternatively, a gimbal mirror may be used to direct UV radiation from the optical sensor along one of the multiple beam paths, to a reflector, and back to the optical sensor. The gimbal mirror is capable of being reoriented between the multiple beam paths.

Typically, the deep-ultraviolet monitoring system includes one or more computer controllers. The controller(s) may be connected to an alignment system (e.g., an auto-alignment system). For example, the alignment system may include a visible laser for aligning the detector assembly and the source assembly (or assemblies). The visible laser can also be used for atmospheric scattering normalization. For example, the visible laser can be used to detect Mie scattering from dust clouds to help eliminate false positive readings from the monitoring system.

The controller typically includes software for determining event characteristics (e.g., the location, speed, and/or direction of a plume or a fugitive release). In particular, the controller analyzes data provided by the deep-ultraviolet optical sensors to determine event characteristics. The controller may also be in communication with one or more sensors providing real-time weather information (e.g., wind speed and direction). Event characteristics may be determined by, among other things, (i) comparing the measurements along the different beam paths, (ii) combining information from multiple optical sensors (e.g., along opposite fence lines), (iii) combining wind direction information with concentration measurements, and/or (iv) analyzing the temporal response characteristics of the sensor data.

In one embodiment, the deep-ultraviolet monitoring system includes a canister sampling system for collecting air samples. For example, upon the detection of an event (e.g., a leak), the controller may trigger the release of a canister (e.g., a summa canister) at the location of the event. The air collected by the canister can then be analyzed to provide additional information (e.g., speciation of the collected air sample).

In another embodiment, the deep-ultraviolet monitoring system may be in communication with a notification system. For example, the monitoring system may trigger an alarm upon the detection of a plume of sufficient size. Moreover, the notification system may provide users and/or the public real-time information (e.g., location, size, speed, and/or direction) regarding a detected plume.

Although the present application describes optical sensors (and related systems and methods) operating in the deep-ultraviolet spectral range, the present optical sensors (and related systems and methods) can operate in other regions of the electromagnetic spectrum (e.g., ultraviolet, visible light, infrared, and microwave regions).

For example, the present invention embraces a mid-infrared optical sensor (MIROS). The mid-infrared optical sensor includes one or more IR sources, such as an enhanced IR source, a silicon carbide glow bar, a quartz halogen lamp, or a mid-infrared laser source (e.g., a quantum-cascade laser, a non-linear frequency mixed laser, or a fiber laser).

The signal channel is typically at a wavelength or range of wavelength between about 2.9 microns and 3.2 microns, such as between about 3.0 microns and 3.2 microns (e.g., a wavelength of about 3.1 microns). A wavelength of between about 2.9 microns and 3.2 microns corresponds to the C-H stretch region of the hydrocarbon absorption continuum. Accordingly, the mid-infrared optical sensor is particularly suitable for detecting hydrocarbons.

The reference channel is typically just outside the C-H stretch region of the hydrocarbon absorption continuum. For example, the reference channel is typically at a wavelength or range of wavelength (i) between about 2.8 microns and 2.9 microns or (ii) between about 3.2 microns and 3.3 microns.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An open-path optical sensor, comprising:
a source assembly, said source assembly emitting UV radiation corresponding to a signal channel and a reference channel;
a detector assembly for receiving UV radiation emitted by said source assembly, said detector assembly comprising (i) a first detector for detecting UV radiation corresponding to the signal channel, (ii) a second detector for detecting UV radiation corresponding to the reference channel, and (iii) a data acquisition system in communication with said first detector and said second detector;
a plurality of reflectors for directing UV radiation emitted by said source assembly to said detector assembly, each of said reflectors being positioned at one end of a different monitoring path, said detector assembly being positioned at the other end of each monitoring path; and
a positioning device, said source assembly and said detector assembly being mounted on said positioning device, wherein said positioning device is capable of reorienting said source assembly and said detector assembly between the monitoring paths;
wherein said first detector comprises a band-pass filter for rejecting UV radiation outside of the signal channel;
wherein said second detector comprises a band-pass filter for rejecting UV radiation outside of the reference channel;
wherein said data acquisition system calculates the ratio of (i) the intensity of the UV radiation corresponding to the signal channel to (ii) the intensity of the UV radiation corresponding to the reference channel;
wherein the signal channel is a wavelength or range of wavelengths between about 170 nanometers and 230 nanometers; and
wherein the reference channel is a wavelength or range of wavelengths between about 260 nanometers and 300 nanometers.

2. The open-path optical sensor according to claim 1, wherein said source assembly emits collimated UV radiation.

3. The open-path optical sensor according to claim 1, wherein said source assembly emits UV radiation at a regular pulse frequency.

4. The open-path optical sensor according to claim 3, wherein said detector assembly comprises a lock-in amplifier for eliminating UV radiation not having the same regular pulse frequency as the UV radiation emitted by said source assembly.

5. The open-path optical sensor according to claim 1, wherein said detector assembly comprises a beam splitter for directing UV radiation to said first detector and to said second detector.

6. The open-path optical sensor according to claim 1, wherein said first detector is a photomultiplier tube and said second detector is a photomultiplier tube.

7. The open-path optical sensor according to claim 1, wherein:
the signal channel is a wavelength or range of wavelengths between about 200 nanometers and 210 nanometers; and
the reference channel is a wavelength or range of wavelengths between about 270 nanometers and 290 nanometers.

8. A pollution monitoring system, comprising:
a plurality of optical sensors according to claim 1; and
a controller in communication with said optical sensors, said controller analyzing data provided by said optical sensors to determine pollution characteristics.

9. An open-path optical sensor, comprising:
a source assembly, said source assembly emitting UV radiation corresponding to a signal channel and a reference channel;
a detector assembly for receiving UV radiation emitted by said source assembly, said detector assembly comprising (i) a first detector for detecting UV radiation corresponding to the signal channel, (ii) a second detector for detecting UV radiation corresponding to the reference channel, and (iii) a data acquisition system in communication with said first detector and said second detector;
a plurality of reflectors for directing UV radiation emitted by said source assembly to said detector assembly, each of said reflectors being positioned at one end of a different monitoring path, said detector assembly being positioned at the other end of each monitoring path; and
a gimbal mirror, said gimbal mirror being positioned to direct UV radiation from said source assembly to one of said reflectors and back to said detector assembly, wherein said gimbal mirror is capable of being reoriented between the monitoring paths;
wherein said first detector comprises a band-pass filter for rejecting UV radiation outside of the signal channel;
wherein said second detector comprises a band-pass filter for rejecting UV radiation outside of the reference channel;
wherein said data acquisition system calculates the ratio of (i) the intensity of the UV radiation corresponding to the signal channel to (ii) the intensity of the UV radiation corresponding to the reference channel;

wherein the signal channel is a wavelength or range of wavelengths between about 170 nanometers and 230 nanometers; and wherein the reference channel is a wavelength or range of wavelengths between about 260 nanometers and 300 nanometers.

10. The open-path optical sensor according to claim 9, wherein said source assembly emits collimated UV radiation at a regular pulse frequency.

11. The open-path optical sensor according to claim 10, wherein said detector assembly comprises:
a beam splitter for directing UV radiation to said first detector and to said second detector; and
a lock-in amplifier for eliminating UV radiation not having the same regular pulse frequency as the UV radiation emitted by said source assembly.

12. A pollution monitoring system, comprising:
a plurality of optical sensors according to claim 9; and
a controller in communication with said optical sensors, said controller analyzing data provided by said optical sensors to determine pollution characteristics.

13. An open-path optical sensor, comprising:
a source assembly, said source assembly emitting UV radiation corresponding to a signal channel and a reference channel;
a detector assembly for receiving UV radiation emitted by said source assembly, said detector assembly comprising (i) a first detector for detecting UV radiation corresponding to the signal channel, (ii) a second detector for detecting UV radiation corresponding to the reference channel, and (iii) a data acquisition system in communication with said first detector and said second detector;
a plurality of source assemblies for emitting UV radiation toward said detector assembly, each of said source assemblies emitting UV radiation corresponding to the signal channel and the reference channel, wherein each of said source assemblies is positioned at one end of a different monitoring path, said detector assembly being positioned at the other end of each monitoring path; and
a positioning device, said detector assembly being mounted on said positioning device, wherein said positioning device is capable of reorienting said detector assembly between the monitoring paths;
wherein said first detector comprises a band-pass filter for rejecting UV radiation outside of the signal channel;
wherein said second detector comprises a band-pass filter for rejecting UV radiation outside of the reference channel;
wherein said data acquisition system calculates the ratio of (i) the intensity of the UV radiation corresponding to the signal channel to (ii) the intensity of the UV radiation corresponding to the reference channel;
wherein the signal channel is a wavelength or range of wavelengths between about 170 nanometers and 230 nanometers; and
wherein the reference channel is a wavelength or range of wavelengths between about 260 nanometers and 300 nanometers.

14. The open-path optical sensor according to claim 13, wherein said source assembly emits collimated UV radiation.

15. The open-path optical sensor according to claim 13, wherein said source assembly emits UV radiation at a regular pulse frequency.

16. The open-path optical sensor according to claim 15, wherein said detector assembly comprises a lock-in amplifier for eliminating UV radiation not having the same regular pulse frequency as the UV radiation emitted by said source assembly.

17. The open-path optical sensor according to claim 13, wherein said detector assembly comprises a beam splitter for directing UV radiation to said first detector and to said second detector.

18. The open-path optical sensor according to claim 13, wherein said first detector is a photomultiplier tube and said second detector is a photomultiplier tube.

19. The open-path optical sensor according to claim 13, wherein:
the signal channel is a wavelength or range of wavelengths between about 200 nanometers and 210 nanometers; and
the reference channel is a wavelength or range of wavelengths between about 270 nanometers and 290 nanometers.

20. A pollution monitoring system, comprising:
a plurality of optical sensors according to claim 13; and
a controller in communication with said optical sensors, said controller analyzing data provided by said optical sensors to determine pollution characteristics.

* * * * *